United States Patent
Veling et al.

(10) Patent No.: US 12,098,222 B2
(45) Date of Patent: Sep. 24, 2024

(54) METHOD FOR PREPARING AN AQUEOUS POLYMER DISPERSION FROM A VINYL AROMATIC COMPOUND AND A CONJUGATED ALIPHATIC DIENE

(71) Applicant: BASF SE, Ludwigshafen am Rhein (DE)

(72) Inventors: Nico Veling, Ludwigshafen am Rhein (DE); Carmen-Elena Cimpeanu, Ludwigshafen am Rhein (DE); Dirk Lawrenz, Hassloch (DE)

(73) Assignee: BASF SE, Ludwigshafen am Rhein (DE)

(*) Notice: Subject to any disclaimer, the term of this patent is extended or adjusted under 35 U.S.C. 154(b) by 695 days.

(21) Appl. No.: 17/299,680

(22) PCT Filed: Nov. 21, 2019

(86) PCT No.: PCT/EP2019/082153
§ 371 (c)(1),
(2) Date: Jun. 3, 2021

(87) PCT Pub. No.: WO2020/114798
PCT Pub. Date: Jun. 11, 2020

(65) Prior Publication Data
US 2022/0033534 A1 Feb. 3, 2022

(30) Foreign Application Priority Data
Dec. 3, 2018 (EP) .................................. 18209826

(51) Int. Cl.
| | |
|---|---|
| C08F 2/22 | (2006.01) |
| C08F 2/38 | (2006.01) |
| C08F 212/08 | (2006.01) |
| C08F 220/06 | (2006.01) |
| C08F 222/02 | (2006.01) |
| C08F 236/06 | (2006.01) |
| C08F 236/08 | (2006.01) |
| C08K 5/14 | (2006.01) |
| D21H 19/58 | (2006.01) |

(52) U.S. Cl.
CPC .................. *C08F 2/22* (2013.01); *C08F 2/38* (2013.01); *C08F 212/08* (2013.01); *C08F 220/06* (2013.01); *C08F 222/02* (2013.01); *C08F 236/06* (2013.01); *C08F 236/08* (2013.01); *C08K 5/14* (2013.01); *D21H 19/58* (2013.01); *C08F 2800/20* (2013.01)

(58) Field of Classification Search
USPC .................................................. 526/84, 228
See application file for complete search history.

(56) References Cited

U.S. PATENT DOCUMENTS 6,258,890 B1 * 7/2001 Schmidt-Thuemmes .................... C08F 236/10
524/561
8,003,716 B2 * 8/2011 Evstatieva ........... C09D 151/02
526/213
8,329,803 B2 * 12/2012 Evstatieva ........... C09D 155/02
524/734

(Continued)

FOREIGN PATENT DOCUMENTS

| EP | 0407059 A2 | 1/1991 |
| EP | 0773245 A2 | 5/1997 |
| EP | 1229051 A1 | 8/2002 |

(Continued)

OTHER PUBLICATIONS

International Preliminary Report on Patentability received for PCT Patent Application No. PCT/EP2019/082153, mailed on Jun. 17, 2021, 15 pages (10 pages of English Translation and 5 pages of Original Document).

(Continued)

*Primary Examiner* — Fred M Teskin
(74) *Attorney, Agent, or Firm* — Faegre Drinker Biddle & Reath LLP

(57) ABSTRACT

The present invention relates to a process for producing an aqueous polymer dispersion by free-radically initiated aqueous emulsion polymerization, by polymerizing, in an aqueous medium,
(a) 40 to 75 parts by weight of at least one vinylaromatic compound and
(b) 24.9 to 59.9 parts by weight of at least one conjugated aliphatic diene
(c) 0.1 to 10 parts by weight of at least one monomer comprising acid groups and
(d) 0 to 20 parts by weight of at least one other monoethylenically unsaturated monomer,
the amounts of the monomers (a) to (d) adding up to 100 parts by weight,
in a monomer feed process in the presence of at least one inorganic peroxide and at least one organic peroxide, with the proviso that
the continuous metering of the inorganic peroxide starts at the same time as the continuous metering of the vinylaromatic compound,
the metering of the organic peroxide is started at a time at which at least 5% and not more than 20% of the vinylaromatic compound has already been metered in in a continuous mass flow under polymerization conditions and
optionally a portion of the inorganic peroxide is initially charged,
and also to the aqueous polymer dispersions produced by the process and to the use of these as a binder, adhesive, sizing agent for fibers, for the production of coatings or for the production of a paper coating slip.

9 Claims, No Drawings

(56) References Cited

U.S. PATENT DOCUMENTS

2011/0281130 A1* 11/2011 Evstatieva ................ C08F 2/38
524/556
2022/0033550 A1* 2/2022 Lawrenz ................ D21H 19/54

FOREIGN PATENT DOCUMENTS

| EP | 1380597 A1 | 1/2004 |
|----|------------|--------|
| WO | 2005/016977 A1 | 2/2005 |
| WO | 2007/000420 A1 | 1/2007 |
| WO | 2009/047233 A1 | 4/2009 |
| WO | 2010/094641 A1 | 8/2010 |

OTHER PUBLICATIONS

International Search Report and Written Opinion received for PCT Patent Application No. PCT/EP2019/082153, mailed on Jan. 10, 2020, 18 pages (9 pages of English Translation and 9 pages of Original Document).

\* cited by examiner

METHOD FOR PREPARING AN AQUEOUS POLYMER DISPERSION FROM A VINYL AROMATIC COMPOUND AND A CONJUGATED ALIPHATIC DIENE

CROSS-REFERENCE TO RELATED APPLICATIONS

This application is a national stage application (under 35 U.S.C. § 371) of PCT/EP2019/082153, filed Nov. 21, 2019, which claims benefit of European Application No. 18209826.9, filed Dec. 3, 2018, both of which are incorporated herein by reference in their entirety.

The invention relates to a process for producing an aqueous polymer dispersion, wherein a vinylaromatic compound and a conjugated aliphatic diene are copolymerized in aqueous medium in the presence of various free-radical initiators. The invention also relates to the aqueous polymer dispersions produced by the process and to the use of these as a binder, adhesive, sizing agent for fibers, for the production of coatings or for the production of a paper coating slip.

BACKGROUND OF THE INVENTION

Known binders for paper coating slips based on copolymers of vinylaromatic compounds and aliphatic dienes are not yet completely satisfactory in all respects. In the case of aqueous emulsion copolymers formed from vinylaromatic compounds and aliphatic dienes, side reactions of the dienes lead to the formation of intensely odorous Diels-Alder adducts.

In many processes for producing styrene-butadiene polymer dispersions, chain transfer agents are additionally used in order to prevent an excessive crosslinking of the polymers due to the second, still-present double bond which can have disadvantageous effects on the performance properties of the dispersion. The often strong intrinsic odor of these chain transfer agents is disadvantageous.

WO 2005/016977 teaches a process for producing aqueous styrene-butadiene polymer dispersions having a low content of residual monomers by free-radically initiated emulsion polymerization, by using, as initiator, a water-soluble and an oil-soluble free-radical initiator and increasing the polymerization temperature over the course of the polymerization. The oil-soluble free-radical initiator is initially charged in the reaction vessel, while the water-soluble free-radical initiator is metered in in parallel with the monomers. The initial charge of oil-soluble free-radical initiators results in a high proportion of 4-phenylcyclohexene and a relatively high residual monomer content. According to the teaching of this document, the residual monomer content is lowered by heating at the end of the polymerization to temperatures around 120° C. However, this leads to crosslinking reactions which can only be prevented by adding chain transfer agents, so-called regulators.

EP1380597 teaches styrene-butadiene dispersions as binder for paper coatings, which are produced using peroxides as chain transfer agents. According to this teaching, the conditions should be chosen so that the peroxides do not act as initiator and the addition of ammonium or sodium persulfate as initiator is necessary. This makes it necessary for ammonium or sodium persulfate to be present from the beginning of the reaction. The time at which the peroxide is added is not described in more detail.

EP 1 229 051 also teaches polymerizations using hydroperoxides as a regulator in combination with a redox initiator which is metered in at the same time as the monomers.

EP 407 059 teaches starting the reaction with a redox initiator system based on hydroperoxide in a first reaction step, followed by a second stage initiated with an inorganic initiator.

However, what is common to all of these processes is that they are unsatisfactory in terms of the proportion of 4-phenylcyclohexene. It was an object of the invention to provide a process for producing aqueous polymer dispersions based on copolymers formed from vinylaromatics and conjugated aliphatic dienes which have a lower proportion of 4-phenylcyclohexene. A process was sought which made it possible to dispense with sulfur- or halogen-comprising chain transfer agents as completely as possible.

BRIEF SUMMARY OF THE INVENTION

The object is achieved according to the invention by a process for producing an aqueous polymer dispersion by free-radically initiated aqueous emulsion polymerization, by polymerizing, in an aqueous medium,
(a) 40 to 75 parts by weight of at least one vinylaromatic compound and
(b) 24.9 to 59.9 parts by weight of at least one conjugated aliphatic diene
(c) 0.1 to 10 parts by weight of at least one monomer comprising acid groups and
(d) 0 to 20 parts by weight of at least one other monoethylenically unsaturated monomer, the amounts of the monomers (a) to (d) adding up to 100 parts by weight, in a monomer feed process in the presence of at least one inorganic peroxide and at least one organic peroxide, with the proviso that
the continuous metering of the inorganic peroxide starts at the same time as the continuous metering of the vinylaromatic compound,
the metering of the organic peroxide is started at a time at which at least 5% and not more than 20% of the vinylaromatic compound has already been metered in in a continuous mass flow under polymerization conditions and
optionally a portion of the inorganic peroxide is initially charged.

DETAILED DESCRIPTION OF THE INVENTION

When reference is made in the context of this application to 5% of the vinylaromatic compound, this is based on the total amount of vinylaromatic compound.

If an amount is reported in parts by weight hereinafter, this is based on 100 parts by weight of total monomers, unless specified otherwise.

The following ethylenically unsaturated monomers (a), (b), (c) and (d) can be used to produce the aqueous polymer dispersions.

Examples of suitable vinylaromatic compounds (monomers of group (a)) include styrene, α-methylstyrene and/or vinyltoluene. From this group of monomers, preference is given to choosing styrene.

The monomers (a) together form a proportion of 40 to 75 parts by weight, and preferably 45 to 70 parts by weight, in particular 50 to 65 parts by weight, based on 100 parts by weight of total monomers (a to d).

Examples of conjugated aliphatic diene (monomers of group (b)) which may be mentioned include 1,3-butadiene, isoprene, 1,3-pentadiene, dimethyl-1,3-butadiene and cyclopentadiene. From this group of monomers, preference is given to using 1,3-butadiene and/or isoprene.

The total amount of monomers (b) is 24.9 to 59.9 parts by weight, preferably 29.9 to 54.9 parts by weight and in particular 34.9 to 49.9 parts by weight, based on 100 parts by weight of total monomers.

Examples of monomers comprising acid groups (monomers (c)) which may be mentioned include ethylenically unsaturated carboxylic acids, ethylenically unsaturated sulfonic acids and vinylphosphonic acid. The ethylenically unsaturated carboxylic acids used are preferably α,β-monoethylenically unsaturated mono- and dicarboxylic acids having 3 to 6 carbon atoms in the molecule. Examples of these are acrylic acid, methacrylic acid, itaconic acid, maleic acid, fumaric acid, crotonic acid, vinylacetic acid and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preference is given to using acrylic acid, methacrylic acid and itaconic acid. The cited acids may be used either as a single component or as a combination thereof.

The monomers comprising acid groups may be used in the polymerization in the form of the free acids or else in a form partially or completely neutralized by suitable bases. Preference is given to using sodium hydroxide solution, potassium hydroxide solution or ammonia as neutralizing agent.

The total amount of monomers (c) is 0.1 to 10 parts by weight, preferably 0.1 to 8 parts by weight or 1 to 6 parts by weight, based on 100 parts by weight of total monomers.

Other monomethylenically unsaturated monomers (d) are monomers which differ from the monomers of groups (a), (b), and (c). They are preferably selected from acrylamide and methacrylamide, vinyl esters of saturated $C_1$ to $C_{18}$ carboxylic acids, preferably vinyl acetate, and esters of acrylic acid and methacrylic acid with monohydric $C_1$ to $C_{18}$ alcohols such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate, allyl esters of saturated carboxylic acids, vinyl ethers, vinyl ketones, dialkyl esters of ethylenically unsaturated carboxylic acids, N-vinylpyrrolidone, N-vinylpyrrolidine, N-vinylformamide, N,N-dialkylaminoalkylacrylamides, N,N-dialkylaminoalkylmethacrylamides, N,N-dialkylaminoalkyl acrylates, N,N-dialkylaminoalkyl methacrylates, vinyl chloride and vinylidene chloride (monomers of group (d)).

This group of monomers is optionally used for modification of the polymers. The total amount of all other monomers may be up to 20 parts by weight based on 100 parts of total monomer. Based on 100 parts by weight of the total monomers, the proportion of one or more monomers of group (d) is 0 to 20 parts by weight, preferably 0.1 to 15 parts by weight and in particular 0.5 to 10 parts by weight.

If this comprises acrylonitrile and/or methacrylonitrile, the amount thereof used is preferably 2 to 12 parts by weight and in particular 4 to 9 parts by weight, based on 100 parts by weight of total monomer.

Preference is given to a process in which the vinylaromatic compound is styrene and/or methylstyrene and the conjugated aliphatic diene is 1,3-butadiene and/or isoprene. The process is particularly advantageous for producing styrene-butadiene dispersions.

It is advantageous to polymerize
(a) 60 to 75 parts by weight of at least one vinylaromatic compound and
(b) 24.9 to 39.9 parts by weight of at least one conjugated aliphatic diene
(c) 0.1 to 8 parts by weight of at least one monomer comprising acid groups and
(d) 0 to 10 parts by weight of at least one other monoethylenically unsaturated monomer,
the amounts of the monomers (a) to (d) adding up to 100 parts by weight.

Particular preference is given to polymerizing
(a) 60 to 70 parts by weight of at least one vinylaromatic compound and
(b) 29 to 39 parts by weight of at least one conjugated aliphatic diene
(c) 1 to 6 parts by weight of at least one monomer comprising acid groups and
(d) 0 to 5 parts by weight of at least one other monoethylenically unsaturated monomer, the amounts of the monomers (a) to (d) adding up to 100 parts by weight.

The emulsion polymerization is effected in an aqueous medium. This can for example be fully deionized water or else mixtures of water and a solvent miscible therewith such as methanol, ethanol, ethylene glycol, glycerol, sugar alcohols such as sorbitol or tetrahydrofuran. The total amount of the aqueous medium is proportioned here such that the aqueous polymer dispersion obtained has a solids content of 20% to 70% by weight, frequently 30% to 65% by weight and often 40% to 60% by weight.

The inorganic and organic peroxides used according to the invention are free-radical initiators—also referred to as free-radical polymerization initiators—that is to say peroxides which form free radicals under the reaction conditions.

A characteristic of the process according to the invention is that it is a monomer feed process in which both inorganic and organic peroxides are used.

Monomer feed processes are understood to mean that the main amount, typically at least 80%, preferably at least 90%, of the monomers to be polymerized are supplied to the polymerization reaction under polymerization conditions.

Polymerization conditions are generally understood to mean those amounts of free-radical initiator, temperatures and pressures under which the free-radically initiated aqueous emulsion polymerization does not come to a halt. The polymerization depends in principle on the nature and amount of the free-radical initiator used. The relationships between temperature and decomposition rate are sufficiently well known to those skilled in the art for the commonly used polymerization initiators or can be determined by routine experiments.

Preference is given to a process according to the invention in which during the monomer feed no reducing agent capable of forming a redox initiator system with the organic or inorganic peroxides is present. Reducing agents of this kind are described hereinafter with regard to the chemical treatment of residual monomers with redox initiators.

Examples of suitable inorganic peroxides include hydrogen peroxide and ammonium or alkali metal salts of peroxodisulfates, such as the mono- or dialkali metal or ammonium salts of peroxodisulfuric acid, for example the mono- and disodium, mono- and dipotassium, or ammonium salts thereof. It is of course also possible to use mixtures of the abovementioned inorganic peroxides.

Examples of suitable organic peroxides are peroxides such as alkyl hydroperoxides, for example tert-butyl hydroperoxide, aryl hydroperoxides, for example p-menthyl or cumene hydroperoxide, and dialkyl or diaryl peroxides, for example di-tert-butyl, dibenzoyl or dicumene peroxide. It is of course also possible to use mixtures of the abovementioned organic peroxides.

Preference is given to organic peroxides which are both oil- and water-soluble. In the context of this document, water-soluble organic peroxides should be understood as meaning those having a solubility of 1% by weight in deionized water at 20° C. and atmospheric pressure. In the context of this document, oil-soluble organic peroxides should be understood as meaning those having a solubility of 1% by weight in styrene at 20° C. and atmospheric pressure. Examples which may be mentioned include alkyl hydroperoxides, such as tert-butyl, p-menthyl or cumene hydroperoxide.

The inorganic peroxide is preferably selected from hydrogen peroxide and ammonium or alkali metal salts of peroxodisulfates and the organic peroxides selected from alkyl hydroperoxides and aryl hydroperoxides.

Particular preference is given to using the following combinations of peroxodisulfates with alkyl hydroperoxides, for example, sodium peroxodisulfate with t-butyl hydroperoxide or ammonium peroxodisulfate with t-butyl hydroperoxide.

The total amount of the free-radical initiator used (inorganic+organic) is generally from 0.1 to 5 parts by weight, preferably 0.5 to 4 parts by weight, based in each case on 100 parts by weight of total monomers. The ratio of the total amount of inorganic peroxide to the total amount of organic peroxide is preferably 1/10 to 10/1, preferably 1/5 to 5/1, in particular 1/3 to 3/1, viewed over the whole process.

A characteristic of the process according to the invention is that the metering of the organic peroxide is started at a time at which at least 5%, preferably at least 8%, in particular at least 10%, and not more than 20% of the vinylaromatic compound has already been metered in in a continuous mass flow. The time of addition is therefore independent of whether the polymerization was initiated with or without an initial charge.

Initiation of the polymerization reaction is understood to mean the start of the polymerization reaction of the monomers present in the polymerization vessel as a result of decomposition of the free-radical initiator. The polymerization starts for example when the polymerization mixture comprises monomers and inorganic peroxide and reaches a temperature in the range from 80° C. to 95° C.

In order to start the polymerization, firstly an aqueous solution is prepared comprising a portion of protective colloid and/or an emulsifier in dissolved form, optionally a portion of inorganic peroxide, optionally a portion of monomer and optionally polystyrene seed. This mixture is preferably heated to the temperature at which the monomers are intended to be polymerized. As soon as the respectively desired polymerization temperature has been reached or within a time period of 1 to 15 minutes, preferably 1 to 10 minutes, after reaching the polymerization temperature, metering of the monomers and of the inorganic peroxide is started.

According to a preferred embodiment, the polymerization is initiated in an aqueous polymerization mixture comprising up to 5% of the vinylaromatic compound and no aliphatic diene. The polymerization then starts when 0.1% to 5% of the vinylaromatic compound has been provided, the reaction temperature has been set to a temperature in the range from ≥80° C. to ≤95° C. and inorganic peroxide, preferably 0.1 to 0.5 part by weight of the inorganic peroxide based on 100 parts by weight of total monomer, has been provided.

The order in which these conditions are established is not crucial.

Particular preference is given to choosing 0.1 to 0.5 part by weight of inorganic peroxide, preferably an ammonium salt or an alkali metal salt of a peroxodisulfate, for initiating the polymerization and then metering in the vinylaromatic compound and 0.1 to 2 parts by weight of inorganic peroxide, wherein the 0.1 to 2 parts by weight of organic peroxide are only metered in starting from the time at which at least 5% of the vinylaromatic compound has already been metered in, wherein the metering of the inorganic peroxide, the organic peroxide and also the vinylaromatic compound is effected in each case in a continuous mass flow and the parts by weight of the peroxides are based in each case on 100 parts by weight of total monomers.

As in all free-radical polymerization reactions, it is advantageous if the initial charge of the reaction components, the metering/polymerization and the post-reaction are effected in the reaction vessel under an inert gas atmosphere, for example under nitrogen or argon atmosphere.

Preferred polymerization conditions are a temperature in the range from 80° C. to 105° C., preferably 85° C. to 100° C. The metering of the conjugated aliphatic diene is generally effected at elevated pressure. The metering of the conjugated aliphatic diene preferably takes place at a pressure in the range from 5 to 15 bar. The elevated pressure has the effect that for example the 1,3-butadiene which is gaseous at standard pressure and room temperature largely resides in the polymerization mixture.

The monomer metering is preferably effected in a continuous mass flow, that is to say without interruption. In this case, the monomers are preferably metered in with a metering rate which deviates from the average value of the respective overall feed by no more than 30%, preferably by no more than 20%. According to a preferred embodiment, the metering rate of the monomers (increase in the monomers) corresponds approximately to the polymerization rate of the monomers (decrease in the monomers).

The process according to the invention is a monomer feed process. It is possible here for the polymerization vessel to be initially charged with a portion of the monomers at the start of the polymerization. Thus, according to this variant up to 20 parts by weight of all monomers, preferably up to 5% of the respective monomer, can be initially charged and the polymerization can then be initiated. Particularly preferably, only the monomers (a), (b) and optionally (d) are initially charged, preferably up to 5% of the respective monomer.

Preference is also given to a process in which no monomers are initially charged.

According to one embodiment, the continuous metering of the monomers of groups (a), (b), (c) and (d), if the latter is a constituent of the total monomers, is started at the same time.

According to a preferred embodiment, the metering of the conjugated aliphatic diene only starts at a time at which at least 5%, preferably at least 8%, in particular at least 10%, of the vinylaromatic compound has been metered in in a continuous mass flow. The metering of the diene is preferably started when not more than 30% of the vinylaromatic compound has been metered in in a continuous mass flow.

The vinylaromatic compound is metered in under polymerization conditions preferably in a continuous mass flow over a period of at least 120 minutes, preferably over a period of 180 to 300 minutes, especially over a period of 210 to 270 minutes.

The conjugated aliphatic diene is metered in in a continuous mass flow preferably over a period of at least 60 minutes, particularly preferably over a period of 120 to 240 minutes, especially over a period of 150 to 210 minutes, wherein particularly preferably the vinylaromatic compound is additionally metered in in a continuous mass flow over a period of at least 120 minutes, preferably over a period of 180 to 300 minutes, especially over a period of 210 to 270 minutes.

The polymerization can be conducted in the presence of a degraded starch. According to a preferred embodiment, no degraded starch is present during the polymerization. According to a likewise preferred embodiment, the polymerization takes place in the presence of a degraded starch, preferably 15 to 100 parts by weight of a degraded starch based on 100 parts by weight of the monomers.

Suitable starting starches for producing the degraded starches to be used according to the invention are all native starches such as starches from corn, wheat, oats, barley, rice, millet, potatoes, peas, tapioca, sorghum or sago. Starting starches of interest are in addition those natural starches having a high amylopectin content such as waxy corn starch and waxy potato starch. The amylopectin content of these starches is above 90%, usually 95 to 100%.

In addition, starches which have been modified by etherification or esterification may be used to produce the polymer dispersions according to the invention. The modification usually also results in degradation. Such products are known and are commercially available. They are produced for example by esterification of native starches or degraded native starches with inorganic or organic acids, their anhydrides or chlorides. Phosphated and acetylated degraded starches are of particular interest. The most commonly used methods for the etherification of starches consists in treating starch with organic halogen compounds, epoxides or sulfates in aqueous alkaline solution. Known starch ethers are alkyl ethers, hydroxyalkyl ethers, carboxyalkyl ethers and allyl ethers. The reaction products of starches with 2,3-epoxypropyltrimethylammonium chloride are also suitable.

Further suitable starches are cationically modified starches, that is to say starch compounds having amino groups or ammonium groups.

The starches can be degraded enzymatically, oxidatively or hydrolytically by the action of acids or bases. The degradation of starch is generally known and is described in EP 2580257, for example. Degraded starches are commercially available. A degraded starch can be introduced for the polymerization or one can be prepared in situ and the polymerization then conducted in the presence thereof.

Particular preference is given to degraded native starches, in particular native starches degraded to maltodextrin.

Preference is given to degraded starches having an intrinsic viscosity ηi of ≤0.07 dl/g or ≤0.05 dl/g. The intrinsic viscosity ηi of the degraded starches is preferably in the range from 0.02 to 0.06 dl/g. The intrinsic viscosity ηi is determined in accordance with DIN EN 1628 at a temperature of 23° C.

In the context of the process according to the invention, emulsifying auxiliaries can be additionally used that keep both the monomer droplets and the polymer particles in disperse distribution in the aqueous phase and thus ensure the stability of the aqueous polymer dispersion produced. These may be the protective colloids typically used in the performance of free-radical aqueous emulsion polymerizations or they may be emulsifiers.

Suitable protective colloids are, for example, polyvinyl alcohols, cellulose derivatives or copolymers comprising vinylpyrrolidone. An extensive description of suitable protective colloids can be found in Houben-Weyl, Methoden der organischen Chemie [Methods of Organic Chemistry], volume XIV/1, Makromolekulare Stoffe [Macromolecular Materials], Georg-Thieme-Verlag, Stuttgart, 1961, pages 411 to 420.

Useful emulsifiers include interface-active substances having a number-average molecular weight of typically below 2000 g/mol or preferably below 1500 g/mol, whereas the number-average molecular weight of the protective colloids is above 2000 g/mol, for example from 2000 to 100 000 g/mol, in particular from 5000 to 50 000 g/mol.

Examples of suitable emulsifiers are ethoxylated $C_8$ to $C_{36}$ fatty alcohols having a degree of ethoxylation of 3 to 50, ethoxylated mono-, di- and tri-$C_4$- to -$C_{12}$-alkylphenols having a degree of ethoxylation of 3 to 50, alkali metal salts of dialkyl esters of sulfosuccinic acid, alkali metal and ammonium salts of $C_8$- to $C_{12}$-alkyl sulfates, alkali metal and ammonium salts of $C_{12}$- to $C_{18}$-alkyl-sulfonic acids and alkali metal and ammonium salts of $C_9$- to $C_{18}$-alkylarylsulfonic acids. Cationic emulsifiers are for example compounds having at least one amino or ammonium group and at least one $C_8$-$C_{22}$-alkyl group.

Further suitable emulsifiers have been found to be compounds of the general formula I

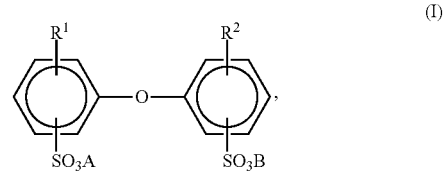

in which $R^1$ and $R^2$ are $C_4$- to $C_{24}$-alkyl and one of the $R^1$ or $R^2$ radicals may also be hydrogen, and A and B may be alkali metal ions and/or ammonium ions. In the general formula I, $R^1$ and $R^2$ are preferably linear or branched alkyl radicals having 6 to 18 carbon atoms, especially having 6, 12 or 16 carbon atoms, or hydrogen atoms, where $R^1$ and $R^2$ are not both simultaneously hydrogen atoms. A and B are preferably sodium, potassium or ammonium ions, with sodium ions being particularly preferred. Particularly advantageous compounds I are those in which A and B are sodium ions, $R^1$ is a branched alkyl radical having 12 carbon atoms and $R^2$ is a hydrogen atom or $R^1$. Technical grade mixtures comprising a proportion of 50% to 90% by weight of the monoalkylated product, for example Dowfax® 2A1 (brand of Dow Chemical Company), are frequently used. The compounds I are common knowledge, for example from U.S. Pat. No. 4,269,749, and are commercially available.

If emulsifiers and/or protective colloids are additionally used as auxiliaries for dispersing the monomers, the amounts used thereof are for example 0.1 to 5 parts by weight based on 100 parts by weight of monomers.

According to one variant of the process, the polymerization is conducted in the presence of a polystyrene seed, preferably in the presence of an aqueous dispersion of finely divided polystyrene having an average particle diameter of 20 to 40 nm (determined by ultracentrifugation). It is preferable to use 0.1 to 5 parts by weight, in particular 0.2 to 3 parts by weight, based on the total monomers. The process is preferably performed with an initially charged seed latex.

In order to modify the properties of the polymers, it is possible to conduct the emulsion polymerization optionally in the presence of at least one chain transfer agent which does not comprise sulfur or halogen. These are typically used to reduce or to control the molecular weight of the polymers obtainable by a free-radical aqueous emulsion polymerization.

The process according to the invention preferably should not comprise the use of chain transfer agent selected from aliphatic and/or araliphatic halogen compounds, organic thio compounds and substituted thiols during the polymerization.

Examples of chain transfer agents which do not comprise sulfur or halogen are aldehydes such as formaldehyde, acetaldehyde and propionaldehyde, organic acids such as formic acid, sodium formate or ammonium formate, alcohols such as in particular isopropanol, and phosphorus compounds such as sodium hypophosphite. If during the polymerization chain-transferring compounds which do not comprise sulfur or halogen are used, the respective amount used is for example 0.01 to 5, preferably 0.1 to 1 parts by weight, based on 100 parts by weight of the monomers used during the polymerization. The chain transfer agents are preferably metered together with the monomers into the initial charge. However, they may also be present in part or in full in the initial charge. They can also be metered in stepwise in a staggered manner with respect to the monomers.

Particular preference is given to a process in which no chain transfer agent is present during the polymerization.

To complete the polymerization reaction, it is sufficient in most cases to stir the reaction mixture after the monomer addition has ended for example for a further 1 to 3 hours at the polymerization temperature. A conversion of around 95% has then typically been achieved.

In order to increase the conversion yet further and hence to lower the residual monomer content, it is possible for example to add further free-radical initiator from the group of the abovementioned initiators to the reaction mixture or to prolong the addition thereof and to conduct what is known as a "postpolymerization", that is to say a polymerization to achieve conversions of >95% up to 99%.

Such a postpolymerization can be conducted at the same, lower or else at higher temperature as/than the main polymerization. For example, 0.1 to 1.5 parts by weight, based on 100 parts by weight of the monomers used in the polymerization, of inorganic peroxide, preferably sodium peroxodisulfate, is metered in in this phase as initiator and the polymerization temperature is set to a temperature in the range from 80 to 120° C.

The pH can be for example 1 to 5 during the polymerization. After the end of the polymerization at a conversion of >95%, the pH is for example adjusted to a value between 6 and 7.

Chemical deodorization can in addition also be performed. If traces of residual monomers are still to be removed, this can also be done chemically by the action of redox initiator systems, as specified in DE-A 44 35 423, DE-A 44 19 518 and in DE-A 44 35 422. Suitable oxidizing agents are in particular the abovementioned organic and/or inorganic peroxides. Suitable reducing agents preferably include sodium disulfite, sodium hydrogen sulfite, sodium dithionite, sodium hydroxymethanesulfinate, formamidinesulfinic acid, acetone bisulfite (=addition product of sodium hydrogensulfite onto acetone), ascorbic acid or reducing sugar compounds, or water-soluble mercaptans such as mercaptoethanol.

The treatment with the redox initiator system is conducted in a temperature range from 60 to 100° C., preferably at 70 to 90° C. The redox partners can each independently be added to the dispersion in their entirety, in portions or continuously over a period of 10 minutes to 4 hours. To improve the postpolymerization action of the redox initiator systems, soluble salts of metals of varying valency, such as iron, copper or vanadium salts, may be added to the dispersion. Complexing agents which keep the metal salts in solution under the reaction conditions are also frequently added.

Following the polymerization reaction (main polymerization+postpolymerization) and optional chemical deodorization, it may be necessary to render the aqueous polymer dispersions largely free from odor carriers such as residual monomers and other volatile organic constituents, which is also referred to as physical deodorization. This can be achieved in a manner known per se by physical means by distillative removal (in particular via steam distillation) or by stripping with an inert gas.

The present invention also relates to the dispersions obtainable by the process according to the invention. These are virtually coagulate-free aqueous dispersions. The amount of coagulate is in the ppm range and is preferably less than 100 ppm, in particular less than 50 ppm. They additionally have a uniform particle size and in general have a solids content of approx. 50% by weight, preferably in the range from 45% to 55% by weight. The dispersions according to the invention have a low proportion of 4-phenylcyclohexene.

The aqueous polymer dispersions according to the invention are used as a binder, adhesive, sizing agent for fibers, for the production of coatings or for the production of paper coating slips. The aqueous polymer dispersions according to the invention are suitable both for the sizing of textile fibers and for the sizing of mineral fibers, especially glass fibers. Because of their good adhesive strength, in particular when using comonomers which lead to a low glass transition temperature of the copolymer (e.g. less than 20° C.), they can also be used as an adhesive for example for the production of laminates and for the production of coatings such as for example barrier coatings. The aqueous polymer dispersions according to the invention are preferably used as binders in paper coating slips.

The invention accordingly also provides a paper coating slip, comprising
(i) inorganic pigment and
(ii) an aqueous polymer dispersion described above and obtainable by the process according to the invention
(iii) and optionally further auxiliaries.

Besides water, paper coating slips generally comprise pigments, binders and auxiliaries for establishing the required rheological properties, for example thickeners. The pigments are typically dispersed in water. The paper coating slip comprises pigments in an amount of preferably at least 80% by weight, for example 80% to 95% by weight or 80% to 90% by weight, based on the total solids content.

White pigments are especially suitable. Examples of suitable pigments are metal salt pigments such as for example calcium sulfate, calcium aluminate sulfate, barium sulfate, magnesium carbonate and calcium carbonate, among which carbonate pigments and especially calcium carbonate are preferred. The calcium carbonate can be ground calcium carbonate (GCC, natural ground calcium carbonate), precipitated calcium carbonate (PCC), lime or chalk. Suitable calcium carbonate pigments are available for example as Covercarb® 60, Hydrocarb® 60 or Hydrocarb® 90 ME. Further suitable pigments are for example silicas, aluminum oxides, aluminum hydroxide, silicates, titanium dioxide, zinc oxide, kaolin, alumina, talc or silicon dioxide. Suitable further pigments are available for example as Capim® MP 50 (clay), Hydragloss® 90 (Clay) or Talcum C10.

The paper coating slip comprises the polymer dispersion produced according to the invention as the sole binder or in combination with further binder. The most important functions of binders in paper coating slips are to bind the pigments to the paper and the pigments to each other and to some extent to fill cavities between pigment particles.

For example, 1 to 50 parts by weight, preferably 1 to 25 parts by weight or 5 to 20 parts by weight of the polymer according to the invention are used (in terms of solids, i.e. without water or other solvents which are liquid at 21° C. and 1 bar) per 100 parts by weight of pigments.

Preference is given to a paper coating slip which comprises the polymers of the aqueous polymer dispersion in an amount of 1 to 50 parts by weight based on the total amount of pigments, and pigments in an amount of 80 to 95 parts by weight based on the total solids content, and an auxiliary, and the pigments of which are selected from the group consisting of calcium sulfate, calcium aluminate sulfate, barium sulfate, magnesium carbonate, calcium carbonate, silicas, aluminum oxides, aluminum hydroxide, silicates, titanium dioxide, zinc oxide, kaolin, alumina, talc and silicon dioxide, and the auxiliary of which is selected from the group consisting of thickeners, further polymeric binders, co-binders, optical brighteners, fillers, leveling agents, dispersants, surfactants, lubricants, neutralizing agents, defoamers, deaerators, preservatives and dyes.

The further synthetic binders which differ from the polymers produced according to the invention are generally known and are described for example in D. Urban and K. Takamura, *Polymer Dispersions and Their Industrial Applications*, 2002, Wiley-VCH Verlag GmbH, Weinheim, chapter 4.4.4, page 90 ff., the disclosure of which is expressly incorporated by reference.

Useful further binders include binders with a natural basis, in particular starch-based binders, and synthetic binders which differ from the polymers produced according to the invention, especially emulsion polymers which can be produced by emulsion polymerization. In this context, "starch-based binders" is to be understood as meaning any native, modified or degraded starch. Native starches can consist of amylose, amylopectin or mixtures thereof. Modified starches can be oxidized starches, starch esters or starch ethers. The molar mass of the starch can be reduced by hydrolysis (degraded starch). Oligosaccharides or dextrins are possible degradation products. Preferred starches are cereal, corn and potato starches. Particular preference is given to cereal starch and corn starch, very particular preference is given to corn starch.

Paper coating slips according to the invention may additionally comprise further auxiliaries, for example fillers, co-binders and thickeners for further optimizing viscosity and water retention, optical brighteners, dispersants, surfactants, lubricants (e.g. calcium stearate and waxes), neutralizing agents (e.g. NaOH or ammonium hydroxide) for adjusting pH, defoamers, deaerators, preservatives (e.g. biocides), leveling agents, dyes (in particular soluble dyes) etc. Useful thickeners include not only synthetic polymers (e.g. crosslinked polyacrylate), but also in particular celluloses, preferably carboxymethyl cellulose. Optical brighteners are for example fluorescent or phosphorescent dyes, in particular stilbenes.

An aqueous paper coating slip is preferably involved; this comprises water in particular already as a result of the preparation form of the constituents (aqueous polymer dispersions, aqueous pigment slurries); the desired viscosity can be set via addition of further water. Customary solids contents of the paper coating slips are in the range from 30% to 80% by weight. The pH of the paper coating slip is preferably set to values of 6 to 11, in particular 7 to 10.

The invention also provides paper or board coated with a paper coating slip according to the invention and a process for coating paper or board, wherein an aqueous polymer dispersion is produced according to the invention; and a paper coating slip is produced using this polymer dispersion, at least one pigment and optional further auxiliaries; and the paper coating slip is applied to at least one surface of paper or board.

The paper coating slip is preferably applied to uncoated base papers or uncoated board. The amount is generally 1 to 50 g, preferably 5 to 30 g (in terms of solids, i.e. without water or other solvents which are liquid at 21° C., 1 bar) per square meter. The coating can be effected by means of customary application processes, for example by means of a size press, film press, blade coater, air brush, knife coater, curtain coating method or spray coater. Depending on the pigment system, the aqueous dispersions of the water-soluble copolymers can be used in paper coating slips for the base coat and/or for the topcoat.

Paper coating slips according to the invention have good performance properties. They have good running characteristics in paper coating processes and have a high level of binding power. The coated papers and boards have good surface strength, especially a very high wet and dry pick resistance. They are readily printable in the customary printing processes, such as relief printing, intaglio printing, offset printing, digital printing, inkjet printing, flexographic printing, newsprint printing, letterpress printing, sublimation printing, laser printing, electrophotographic printing or a combination of these printing processes.

EXAMPLES

Unless the context indicates otherwise, percentages always signify weight percent. Contents reported relate to the content in an aqueous solution or dispersion. The indication pphm (parts per hundred monomers) denotes the proportion by weight based on 100 parts by weight of monomer.

Where water was used in the context of the examples, demineralized water was used.

Glass Transition Temperature $T_G$

The glass transition temperature is determined in accordance with DIN 53765 using a TA8000 series DSC820 instrument from Mettler-Toledo Int. Inc.

Determination of gel content A polymer film is produced from the dispersion by drying in a silicone mold. Rectangles of approx. 2×1.5 cm side length are punched out from this and weighed. The pieces are then placed in a petri dish with methyl ethyl ketone and left there at room temperature for 48 hours. The un-crosslinked portion of the polymer dissolves in the solvent in the course of this. After this time has elapsed, the polymer pieces are removed from the solvent, dried for one hour at 140° C. and reweighed. The weight loss corresponds to the soluble portion of the polymer and the insoluble portion is the so-called gel. This insoluble weight fraction based on the weight of the dried total polymer is the so-called gel content.

Determination of the 4-PCH Content

The 4-phenylcyclohexene content is determined by means of gas chromatography (direct injection). It is reported in ppm based on the dispersion.

Determination of the Coagulate

The amount of coagulate in the dispersion is based on particles having a diameter of >45 μm. It was determined by filtering the finished dispersion through a sieve with a known pore diameter.

The following feedstocks were used in the examples:

Emulsifier A: sodium lauryl sulfate in the form of a 15% by weight solution (Disponil® SDS from BASF)

Emulsifier B: ethoxylated sodium lauryl ether sulfate in the form of a 28% by weight solution (Texapon® NSO P from BASF)

Complexing agents: EDTA in the form of a 2% by weight solution (Triton® BX from BASF)

Seed latex: Polystyrene seed in the form of a 29.7% by weight dispersion with a particle size of approx. 30 nm (determined by means of analytical ultracentrifugation)

Initiator A: 7% by weight solution of sodium peroxodisulfate (NaPS)

Initiator B: 10% by weight solution of tert-butyl hydroperoxide

Reducing agent: 13% by weight solution of acetone bisulfite

Degraded starch: commercial 72% by weight aqueous glucose syrup with a DE value (dextrose equivalent) of 28

In all examples, the metering of the feeds was effected in a uniform mass flow.

Production of the Emulsion Polymers

The following quantities in pphm (parts per hundred monomer) are based on 100 parts by weight of total monomer.

Example 1 Emulsion Polymerization of Styrene/Butadiene/Acrylic Acid

| Initial charge: | |
|---|---|
| 47.48 g | of styrene (2.11 pphm) |
| 192.86 g | of a 7% by weight aqueous solution of itaconic acid (0.6 pphm) |
| 4.5 g | of acrylic acid (0.2 pphm) |
| 75.76 g | of a 29.7% by weight dispersion of a polystyrene latex with an average particle size of 30 nm (1.0 pphm) |
| 18 g | of a 15% by weight solution of sodium lauryl sulfate (emulsifier A) (0.12 pphm) |
| 11.25 g | of a 2% by weight solution of EDTA (complexing agent) (0.01 pphm) |
| 86.79 g | of a 7% by weight solution of sodium peroxodisulfate (initiator A) (0.27 pphm) |
| Feed 1: | |
| 1252.13 g | of styrene (55.6 pphm) |
| Feed 2: | |
| 90 g | of acrylic acid (4.0 pphm) |
| 36 g | of a 15% by weight solution of sodium lauryl sulfate (0.24 pphm) |
| 40.18 g | of a 28% by weight solution of ethoxylated sodium lauryl ether sulfate (emulsifier B) (0.5 pphm) |
| 37.5 g | of 15% by weight sodium hydroxide solution (0.25 pphm) |
| 598 ml | of water |
| Feed 3: | |
| 842.4 g | of butadiene (37.44 pphm) |
| Feed 4: | |
| 273.21 g | of a 7% by weight solution of sodium peroxodisulfate (initiator A) (0.85 pphm) |
| Feed 5: | |
| 231.7 g | of a 10% by weight solution of tert-butyl hydroperoxide (initiator B) (1.03 pphm) |
| Feed 6: | |
| 66.98 g | of acetone bisulfite (0.39 pphm) |

The components of the initial charge and 360 ml of water were placed in a 6 l pressure reactor. The components of the initial charge were mixed and heated to 90° C. The polymerization was then started by adding 0.27 pphm of initiator A.

Immediately afterwards, feeds 1, 2 and 4 were begun (time: 0 minutes), feeds 1 and 2 being effected over the course of 4 hours and feed 4 being effected over a period of 4 hours and 15 minutes. The butadiene feed (feed 3) started 30 minutes after the start (time: 30 minutes) of feeds 1, 2 and 4 and was effected over the course of 3.5 hours. Feed 5 started at the same time as the butadiene (time: 30 minutes). For this feed, an amount of 0.8 pphm was metered in over 3 hours. The addition was then interrupted and resumed after 75 minutes. This second metering stage was effected over a period of 2 hours, in parallel with the addition of feed 6. Immediately before the addition of feed 5 was resumed, 15 g of a 15% by weight sodium hydroxide solution (0.1 pphm) were added. Finally, the mixture was cooled down to room temperature and neutralized to a pH of 6-7 with sodium hydroxide solution.

The metering of the various feeds in example 1 can be shown in the following overview:

| Time [min] | | Feed 1 | Feed 2 | Feed 3 | Feed 4 | Feed 5 | Feed 6 |
|---|---|---|---|---|---|---|---|
| 0 | Initial charge 90° C. + initiator A + monomers of the initial charge | | | | | | |
| 0 | | started | started | | started | | |

-continued

| Time [min] | Feed 1 | Feed 2 | Feed 3 | Feed 4 | Feed 5 | Feed 6 |
|---|---|---|---|---|---|---|
| 30 | | | started | | started | |
| 210 | | | | | stopped (0.8 pphm) | |
| 240 | | stopped | stopped | stopped | | |
| 255 | | | | stopped | | |
| 285 | Addition of sodium hydroxide solution | | | | started | started |
| 405 | | | | | stopped | stopped |

Example 2 (without Delayed Addition of the Butadiene)

Example 2 was conducted in analogy to example 1, with the difference that feeds 1 to 4 are started at the same time (all at time 0). Feed 3 ends at the time: 240 min

Examples 3 and 4

Examples 3 and 4 were conducted in analogy to example 1, the addition of the butadiene being started 60 minutes (example 3) or 90 minutes (example 4) after the start of feeds 1, 2 and 4. Feeds 1 to 3 were ended after 240 min.

Example 5

Example 5 was conducted in analogy to example 1, with the difference that the amount of styrene was increased by 2 pphm (57.6 pphm of styrene) and the amount of butadiene was reduced by 2 pphm (35.44 pphm of butadiene).

Example 6 (without Delayed Addition of Butadiene)

The emulsion polymerization was conducted as in example 1, with the difference that the metered addition of feed 3 started at the same time as feeds 1, 2 and 4 and ended after 240 minutes. A further difference was that 53.6 pphm of styrene were metered in (reduced by 2 pphm) and the amount of butadiene was increased by 2 pphm (39.44 pphm of butadiene).

Example 7

Example 7 was conducted in analogy to example 1, with styrene being increased by 8 pphm (53.6 pphm of styrene) and the amount of butadiene being reduced by 8 pphm (29.44 pphm of butadiene).

Example 8

(Without Delayed Addition of the Butadiene)

The emulsion polymerization was conducted as in example 1, with the difference that the metered addition of feed 3 started at the same time as feeds 1, 2 and 4 and ended at the same time as feeds 1 and 2 (after 240 min). A further difference was that the amount of styrene was increased by 8 pphm and the amount of butadiene was reduced by 8 pphm.

Example 9

The emulsion polymerization was conducted as in example 1, with the difference that the amount of styrene was increased by 10 pphm and the amount of butadiene was reduced by 10 pphm.

TABLE 1

Overview of the reaction conditions of the various examples and the properties of the polymer dispersions

| Ex. | Butadiene delay [min] | Butadiene [pphm] | Styrene [pphm] | $T_G$ [° C.] | Gel content [%] | PCH content [ppm] |
|---|---|---|---|---|---|---|
| 1 | 30 | 37.44 | 55.6 | 4 | 91 | 10 |
| 2 | 0 | 37.44 | 55.6 | 9 | 90 | 40 |
| 3 | 60 | 37.44 | 55.6 | −4 | 90 | 20 |
| 4 | 90 | 37.44 | 55.6 | −9 | 92 | 15 |
| 5 | 30 | 35.44 | 57.6 | 10 | 88 | 15 |
| 6 | 0 | 39.44 | 53.6 | 3 | 93 | 35 |
| 7 | 30 | 29.44 | 63.6 | 21 | 88 | 10 |
| 8 | 0 | 29.44 | 63.6 | 26 | 87 | 35 |
| 9 | 30 | 27.44 | 65.6 | 26 | 84 | 15 |

All of the dispersions obtained from examples 1-9 had low amounts of coagulate.

Example 10

| | Initial charge: |
|---|---|
| 93.96 g | of a 29.7% by weight dispersion of a polystyrene latex with an average particle size of 30 nm (1.6 pphm) |
| 6.25 g | of a 28% by weight solution of ethoxylated sodium lauryl ether sulfate (emulsifier B) (0.1 pphm) |
| 8.75 g | of a 2% by weight solution of EDTA (complexing agent) (0.01 pphm) |
| 743.75 g | of a 72% by weight aqueous glucose syrup (DE value 28) (30 pphm) |
| 25 g | of a 7% by weight solution of sodium peroxodisulfate (initiator A) (0.1 pphm) |
| | Feed 1: |
| 997.5 g | of styrene (57 pphm) |
| 52.5 g | of acrylic acid (3 pphm) |
| | Feed 2: |
| 250 g | of a 7% by weight aqueous solution of itaconic acid (1.0 pphm) |
| | Feed 3: |
| 682.5 g | of butadiene (39 pphm) |
| | Feed 4: |
| 175 g | of a 7% by weight solution of sodium peroxodisulfate (initiator A) (0.7 pphm) |
| | Feed 5: |
| 192.5 g | of a 10% by weight solution of tert-butyl hydroperoxide (initiator B) (1.1 pphm) |
| | Feed 6: |
| 45.42 g | of acetone bisulfite (0.34 pphm) |

The initial charge was placed in 442.08 g of water in a 6 l pressure reactor. The initial charge was heated to 90° C. in a reactor. 0.1 pphm of initiator A was then added.

Feeds 1, 2, 4 and 5 were then started at the same time, feed 2 being added over a period of 30 min and feeds 1 and 4 being added over a period of 2.5 hours. The butadiene feed (feed 3) started 30 minutes after the start of feeds 1, 2, 4 and 5 and was effected over the course of 2 hours (end point after 150 minutes). Feed 5 was stopped after 2.5 hours after the addition of 0.9 pphm. After 3 hours and 30 min, 70 g of a 15% by weight sodium hydroxide solution (0.6 pphm) were metered in and then the remaining amount of feed 5 was metered in in parallel with feed 6 over the course of 2 hours. Finally, the mixture was cooled down to room temperature and neutralized to a pH of 6-7 with sodium hydroxide solution.

Example 11 (without Delayed Addition of the Diene)

The emulsion polymerization was conducted as in example 10, with the difference that feeds 1, 2, 3, 4 and 5 are started at the same time (all at time 0) and are ended at the same time (time 150 min).

Example 12 (According to the Invention)

Example 12 was conducted in analogy to example 10, the addition of the butadiene being started 15 minutes after the start of feeds 1, 2, 4 and 5 and being ended jointly with these.

TABLE 2

Overview of the reaction conditions of examples 10-12 and the properties of the polymer dispersions

| Ex. | Butadiene delay [min] | Butadiene [pphm] | Styrene [pphm] | $T_G$ [° C.] | Gel content [%] | PCH content [ppm] |
|---|---|---|---|---|---|---|
| 10 | 30 | 39 | 57 | −3 | 95 | <10 |
| 11 | 0 | 39 | 57 | 6 | 95 | 25 |
| 12 | 15 | 39 | 57 | 4 | 95 | <10 |

$T_G$ glass transition temperature

All of the dispersions obtained according to examples 1-12 had low amounts of coagulate. The particle sizes of the polymer particles resulted from the seed control and did not display any significant deviations as a result of the delays in the diene feed.

The advantages of a mode of operation with delay in the diene feed are clearly apparent from tables 1 and 2. The amount of the odor-causing agent 4-PCH is in each case markedly lower than in the examples 2, 6, 8 and 11 not according to the invention. At the same time, a smaller amount of the diene can be used to achieve a desired glass transition temperature (see experiments 1 and 6, 2 and 5, and 8 and 9). When using the process according to the invention, a use amount of butadiene which is reduced by 2 pphm suffices for the production of a polymer with virtually identical glass transition temperature $T_G$.

For the same proportion of diene, the gel content of the dispersions is not significantly modified as a result of the delayed feed.

Example 13 (Organic Peroxide in Initial Charge; Analogous to WO 2005/016977—not According to the Invention)

| Initial charge: | |
|---|---|
| 500.00 g | of water (27.18 pphm) |
| 132.14 g | of a 7% by weight aqueous solution of itaconic acid (0.5 pphm) |
| 112.00 g | of a 29.7% by weight dispersion of a polystyrene latex with an average particle size of 30 nm (2.01 pphm) |
| 4.00 g | of a 28% by weight solution of ethoxylated sodium lauryl ether sulfate (emulsifier B) (0.06 pphm) |
| 2.50 g | of a 2% by weight solution of EDTA (complexing agent) (0.009 pphm) |
| Addition 1: | |
| 14.44 g | of a 95% by weight solution of tert-butyl peroxybenzoate (initiator A) (0.75 pphm) |
| 50.00 g | of water (2.72 pphm) |
| Feed 1: | |
| 1000.00 g | of styrene (54.37 pphm) |
| Feed 2: | |
| 80 g | of acrylic acid (4.35 pphm) |
| 30 g | of a 28% by weight solution of ethoxylated sodium lauryl ether sulfate (emulsifier B) (0.46 pphm) |
| 20.0 g | of 25% by weight sodium hydroxide solution (0.27 pphm) |
| 476.9 ml | of water (25.93 pphm) |
| Feed 3: | |
| 750 g | of butadiene (40.78 pphm) |
| Feed 4: | |
| 480 g | of a 7% by weight solution of sodium peroxodisulfate (initiator B) (1.83 pphm) |
| Feed 5: | |
| 42.3 g | of a 10% by weight solution of tert-butyl hydroperoxide (initiator C) (0.23 pphm) |
| Feed 6: | |
| 54.76 g | of a 13.1% by weight solution of acetone bisulfite (0.39 pphm) |

The components of the initial charge were placed in a 6 l pressure reactor and mixed. 5% of the entire feed 1 and 5% of the entire feed 2 were then added. The initial charge was heated to 95° C. Initiator A (addition 1) was added slowly at 95° C.

Immediately afterwards, feeds 1, 2, 3 and 4 were begun. Feeds 1, 2 and 3 were effected over the course of 4 hours. Feed 4 was effected over a period of 4 hours and 30 minutes. After the end of feed 4, the polymerization mixture was stirred further for an additional 30 minutes. Feeds 5 and 6 were then started and effected over the course of 1 hour. After the end of feeds 5 and 6, the polymerization mixture was cooled to room temperature.

Example 14 (not According to the Invention)

| Initial charge: | |
|---|---|
| 500.00 g | of water (27.18 pphm) |
| 132.14 g | of a 7% by weight aqueous solution of itaconic acid (0.5 pphm) |

| | |
|---|---|
| 112.00 g | of a 29.7% by weight dispersion of a polystyrene latex with an average particle size of 30 nm (2.01 pphm) |
| 4.00 g | of a 28% by weight solution of ethoxylated sodium lauryl ether sulfate (emulsifier B) (0.06 pphm) |
| 2.50 g | of a 2% by weight solution of EDTA (complexing agent) (0.009 pphm) |

Addition 1:

| | |
|---|---|
| 65.00 g | of a 10% by weight solution of tert-butyl hydroperoxide (initiator C) (0.35 pphm) |

Feed 1:

| | |
|---|---|
| 1000.00 g | of styrene (54.37 pphm) |

Feed 2:

| | |
|---|---|
| 80 g | of acrylic acid (4.35 pphm) |
| 30 g | of a 28% by weight solution of ethoxylated sodium lauryl ether sulfate (emulsifier B) (0.46 pphm) |
| 20.0 g | of 25% by weight sodium hydroxide solution (0.27 pphm) |
| 462.46 ml | of water (25.14 pphm) |

Feed 3:

| | |
|---|---|
| 750 g | of butadiene (40.78 pphm) |

Feed 4:

| | |
|---|---|
| 480 g | of a 7% by weight solution of sodium peroxodisulfate (initiator B) (1.83 pphm) |

Feed 5:

| | |
|---|---|
| 42.3 g | of a 10% by weight solution of tert-butyl hydroperoxide (initiator C) (0.23 pphm) |

Feed 6:

| | |
|---|---|
| 54.76 g | of a 13.1% by weight solution of acetone bisulfite (0.39 pphm) |

The components of the initial charge were placed in a 6 l pressure reactor and mixed. 5% of the entire feed 1 and 5% of the entire feed 2 were then added. The initial charge was heated to 95° C. Initiator C (addition 1) was added slowly at 95° C.

Immediately afterwards, feeds 1, 2, 3 and 4 were begun. Feeds 1, 2 and 3 were effected over the course of 4 hours. Feed 4 was effected over a period of 4 hours and 30 minutes. After the end of feed 4, the polymerization mixture was stirred further for an additional 30 minutes. Feeds 5 and 6 were then started and effected over the course of 1 hour. After the end of feeds 5 and 6, the polymerization mixture was cooled to room temperature.

Example 15 (According to the Invention)

Initial charge:

| | |
|---|---|
| 500.00 g | of water (27.18 pphm) |
| 132.14 g | of a 7% by weight aqueous solution of itaconic acid (0.5 pphm) |
| 112.00 g | of a 29.7% by weight dispersion of a polystyrene latex with an average particle size of 30 nm (2.01 pphm) |
| 4.00 g | of a 28% by weight solution of ethoxylated sodium lauryl ether sulfate (emulsifier B) (0.06 pphm) |
| 2.50 g | of a 2% by weight solution of EDTA (complexing agent) (0.009 pphm) |

Addition 1:

| | |
|---|---|
| 52.55 g | of a 7% by weight solution of sodium peroxodisulfate (initiator B) (0.20 pphm) |

Feed 1:

| | |
|---|---|
| 1000.00 g | of styrene (54.37 pphm) |

Feed 2:

| | |
|---|---|
| 80 g | of acrylic acid (4.35 pphm) |
| 30 g | of a 28% by weight solution of ethoxylated sodium lauryl ether sulfate (emulsifier B) (0.46 pphm) |
| 20.0 g | of 25% by weight sodium hydroxide solution (0.27 pphm) |
| 650.46 ml | of water (35.37 pphm) |

Feed 3:

| | |
|---|---|
| 750 g | of butadiene (40.78 pphm) |

Feed 4:

| | |
|---|---|
| 210.20 g | of a 7% by weight solution of sodium peroxodisulfate (initiator B) (0.8 pphm) |

Feed 5:

| | |
|---|---|
| 65.00 g | of a 10% by weight solution of tert-butyl hydroperoxide (initiator C) (0.35 pphm) |

Feed 6:

| | |
|---|---|
| 42.3 g | of a 10% by weight solution of tert-butyl hydroperoxide (initiator C) (0.23 pphm) |

Feed 7:

| | |
|---|---|
| 54.76 g | of a 13.1% by weight solution of acetone bisulfite (0.39 pphm) |

The components of the initial charge were placed in a 6 l pressure reactor and mixed. 5% of the entire feed 1 and 5% of the entire feed 2 were then added. The initial charge was heated to 95° C. Initiator B (addition 1) was added slowly at 95° C.

Immediately afterwards, feeds 1, 2, 3 and 4 were begun. Feeds 1, 2 and 3 were effected over the course of 4 hours. Feed 4 was effected over a period of 4 hours and 30 minutes. Feed 5 started 30 minutes after the start of feeds 1, 2, 3 and 4 and was effected over the course of 3 hours. After the end of feed 4, the polymerization mixture was stirred further for an additional 30 minutes. Feeds 6 and 7 were then started and effected over the course of 1 hour. After the end of feeds 6 and 7, the polymerization mixture was cooled to room temperature.

Example 16 (not According to the Invention)

Initial charge:

| | |
|---|---|
| 500.00 g | of water (27.18 pphm) |
| 132.14 g | of a 7% by weight aqueous solution of itaconic acid (0.5 pphm) |
| 112.00 g | of a 29.7% by weight dispersion of a polystyrene latex with an average particle size of 30 nm (2.01 pphm) |
| 4.00 g | of a 28% by weight solution of ethoxylated sodium lauryl ether sulfate (emulsifier B) (0.06 pphm) |
| 2.50 g | of a 2% by weight solution of EDTA (complexing agent) (0.009 pphm) |

Addition 1:

| | |
|---|---|
| 52.55 g | of a 7% by weight solution of sodium peroxodisulfate (initiator B) (0.20 pphm) |

Feed 1:

| | |
|---|---|
| 1000.00 g | of styrene (54.37 pphm) |

Feed 2:

-continued

| | |
|---|---|
| 80 g | of acrylic acid (4.35 pphm) |
| 30 g | of a 28% by weight solution of ethoxylated sodium lauryl ether sulfate (emulsifier B) (0.46 pphm) |
| 20.0 g | of 25% by weight sodium hydroxide solution (0.27 pphm) |
| 650.46 ml | of water (35.37 pphm) |
| | Feed 3: |
| 750 g | of butadiene (40.78 pphm) |
| | Feed 4: |
| 210.20 g | of a 7% by weight solution of sodium peroxodisulfate (initiator B) (0.8 pphm) |
| | Feed 5: |
| 65.00 g | of a 10% by weight solution of tert-butyl hydroperoxide (initiator C) (0.35 pphm) |
| | Feed 6: |
| 42.3 g | of a 10% by weight solution of tert-butyl hydroperoxide (initiator C) (0.23 pphm) |
| | Feed 7: |
| 54.76 g | of a 13.1% by weight solution of acetone bisulfite (0.39 pphm) |

The components of the initial charge were placed in a 6 l pressure reactor and mixed. 5% of the entire feed 1 and 5% of the entire feed 2 were then added. The initial charge was heated to 95° C. Initiator B (addition 1) was added slowly at 95° C.

Immediately afterwards, feeds 1, 2, 3, 4 and 5 were begun. Feeds 1, 2 and 3 were effected over the course of 4 hours. Feed 4 was effected over a period of 4 hours and 30 minutes. Feed 5 was effected over the course of 3 hours. After the end of feed 4, the polymerization mixture was stirred further for an additional 30 minutes. Feeds 6 and 7 were then started and effected over the course of 1 hour. After the end of feeds 6 and 7, the polymerization mixture was cooled to room temperature.

TABLE 3

Various metering times of the initiators

| Example | Initial charge | Polymerization | Chemical deodorization Redox initiator |
|---|---|---|---|
| 13 n.i. | tert-butyl peroxybenzoate | sodium peroxodisulfate | tert-butyl hydroperoxide + acetone bisulfite |
| 14 n.i. | tert-butyl hydroperoxide | sodium peroxodisulfate from the start | tert-butyl hydroperoxide + acetone bisulfite |
| 15 | sodium peroxodisulfate | sodium peroxodisulfate from the start tert-butyl hydroperoxide after 30 min of monomer feed | tert-butyl hydroperoxide + acetone bisulfite |
| 16 n.i. | sodium peroxodisulfate | sodium peroxodisulfate + tert-butyl hydroperoxide both from the start | tert-butyl hydroperoxide + acetone bisulfite | n.i.: not according to the invention

The invention claimed is:

1. A process for producing an aqueous polymer dispersion by free-radically initiated aqueous emulsion polymerization, which comprises polymerizing, in an aqueous medium,
    (a) 40 to 75 parts by weight of at least one vinylaromatic compound and
    (b) 24.9 to 59.9 parts by weight of at least one conjugated aliphatic diene
    (c) 0.1 to 10 parts by weight of at least one monomer comprising acid groups and
    (d) 0 to 20 parts by weight of at least one other monoethylenically unsaturated monomer,
    the amounts of the monomers (a) to (d) adding up to 100 parts by weight,
    in a monomer feed process in the presence of at least one inorganic peroxide and at least one organic peroxide, with the proviso that
        the continuous metering of the inorganic peroxide starts at the same time as the continuous metering of the vinylaromatic compound,
        the metering of the organic peroxide is started at a time at which at least 5% and not more than 20% of the vinylaromatic compound has already been metered in in a continuous mass flow under polymerization conditions and
        optionally a portion of inorganic peroxide is initially charged.

2. The process according to claim 1, wherein the vinylaromatic compound is styrene and/or methylstyrene and the conjugated aliphatic diene is 1,3-butadiene and/or isoprene.

3. The process according to claim 1, wherein during the monomer feed no reducing agent capable of forming a redox initiator system with the organic or inorganic peroxides is present.

4. The process according to claim 1, wherein the inorganic peroxide is selected from hydrogen peroxide and ammonium or alkali metal salts of peroxodisulfates and the organic peroxide is selected from alkyl hydroperoxides and aryl hydroperoxides.

5. The process according to claim 1, wherein the polymerization is initiated in an aqueous polymerization mixture comprising up to 5% of the vinylaromatic compound and no aliphatic diene.

6. The process according to claim 1, wherein polymerization is effected at a temperature in the range from ≥80° C. to ≤105° C.

7. The process according to claim 1, wherein 15 to 60 parts by weight of a degraded starch are used per 100 parts by weight of the monomers.

8. The process according to claim 1, wherein the polymerization is conducted in the presence of an aqueous dispersion of finely divided polystyrene having an average particle diameter of 20 to 40 nm.

9. The process according to claim 1, wherein no chain transfer agent selected from aliphatic and/or araliphatic halogen compounds, organic thio compounds and substituted thiols is used during the polymerization.

* * * * *